United States Patent [19]

Lawton et al.

[11] Patent Number: 5,832,100
[45] Date of Patent: Nov. 3, 1998

[54] METHOD AND APPARATUS FOR CONVERTING DOCUMENTS BETWEEN PAPER MEDIUM AND ELECTRONIC MEDIA USING A USER PROFILE

[75] Inventors: Stephen R. Lawton, Hercules; George H. Warfel, Jr., Emeryville, both of Calif.

[73] Assignee: TRW Inc., Redondo Beach, Calif.

[21] Appl. No.: 57,206

[22] Filed: May 3, 1993

Related U.S. Application Data

[63] Continuation of Ser. No. 753,175, Aug. 30, 1991, abandoned.

[51] Int. Cl.$^6$ .................................................. G06K 9/00
[52] U.S. Cl. ........................................... 382/100; 382/137
[58] Field of Search ............................. 382/1, 7, 61, 100, 382/137, 140, 317; 364/401, 705.05, 705.06; 358/403; 395/925, 934; 705/1

[56] References Cited

U.S. PATENT DOCUMENTS

| | | | |
|---|---|---|---|
| 4,813,077 | 3/1989 | Woods et al. | 382/7 |
| 4,907,285 | 3/1990 | Nakano et al. | 382/48 |
| 5,031,223 | 7/1991 | Rosenbaum et al. | 382/1 |
| 5,040,227 | 8/1991 | Lyke et al. | 382/7 |
| 5,054,096 | 10/1991 | Beizer | 382/41 |
| 5,101,448 | 3/1992 | Kawachiya et al. | 382/61 |
| 5,151,948 | 9/1992 | Lyke et al. | 382/7 |
| 5,202,977 | 4/1993 | Pasetes, Jr. et al. | 395/500 |
| 5,274,468 | 12/1993 | Ojha | 358/448 |

Primary Examiner—Andrew W. Johns
Attorney, Agent, or Firm—Robert W. Keller

[57] ABSTRACT

An apparatus and method for providing access to computerized information services for users unequipped with computers, particularly information services related to commercial transactions. Facsimile images of hardcopy forms are used as means for conveying transactional information.

Each facsimile image contains character and data fields with information for a particular trade transaction. The system captures the facsimile image in bitmap form and converts the character and data fields into computer readable form. The system enhances each image and performs several levels of feature extraction, including character recognition techniques. To efficiently and automatically convert great document volumes, the system optimizes database lookup and human operator manual keying to assist character recognition techniques in developing accurate coded text from the features of the facsimile image. The system must produce accurate coded text strings as the system subsequently converts the coded text string into files of coded text or EDI messages for transmission over telecommunications networks to independent computer systems. Unrecognized or inaccurate characters in the coded text are impermissible in order to form valid EDI messages or coded text files. Thus, validation of the coded text is an important part of the present invention. Additionally, user services provide additional processing of data received from independent computer systems into management information of additional business value to particular system users.

31 Claims, 11 Drawing Sheets

FIG. 11.

METHOD AND APPARATUS FOR CONVERTING DOCUMENTS BETWEEN PAPER MEDIUM AND ELECTRONIC MEDIA USING A USER PROFILE

This is a Continuation of application Ser. No. 07/753,175, filed Aug. 30, 1991, now abandoned.

BACKGROUND OF THE INVENTION

The present invention relates generally to systems, and methods, converting business information presented on one form of medium into another medium form. Specifically, the present invention relates to conversion of commercial transaction information from the medium of documents written on paper to the medium of structured electronic messages. Digital image processing assists in converting the paper to the electronic messages. Independent computer systems exchange these messages extracted from the paper medium. For instance, the present invention relates to an independent computer system for serving requests for initiation of particular activities related to commerce otherwise engaged in commercial transactions among enterprises. The system converts paper documents to validated, structured electronic messages through use of image and data processing systems. Computerized networks facilitate exchange of information to provide an efficient mechanism of servicing the requests.

The environment of the invention relates to the commercial environment characterized by a disparity of use and adoption of computerized information within enterprises; and, many small enterprises and a few large enterprises. The larger enterprises typically rely on computerized information and the smaller enterprises typically rely on paper records and documents. The enterprises respond to an existence of strong incentives to adopt electronic systems to enhance business communication among all enterprises. One such conventional electronic system is a direct computer-to-computer communication known as Electronic Data Interchange (EDI).

EDI provides for the exchange of business information among independent computerized information systems. Upwards of 20,000 U.S. enterprises (business firms and private-sector organizations), use standardized EDI messages to communicate with their trading partners (customers, suppliers, carriers, banks, etc.). Worldwide use is comparable to the use in the United States. These firms displace the largely manual processing of paper documents with computer processing of standardized electronic messages. Consequently, firms able to adopt the EDI business model garner benefits associated with electronic processing and networking. These benefits include: reduced paperwork and associated costs, faster and more accurate communications, improved response to market shifts, faster cycle times for design, manufacturing and delivery, lower inventory costs, and better management control.

However, the EDI model of commercial information exchange makes particular assumptions about the enterprises and the information for exchange. These assumptions include: two or more enterprises each having routine or essential business information in computer-readable form, each enterprise routinely employing software application programs to store, retrieve and process that data, and two or more such enterprises desiring to conduct business transactions among themselves by direct exchanges of computer-readable coded text (messages). Many business enterprises, particularly small ones, do not meet these assumptions. Some enterprises cannot economically meet the assumptions. Many factors contribute to these enterprises' failure to realize the benefits of conducting commerce by EDI. The factors range from an unavailability of business data in computer-readable form, to lack of necessary computer hardware, software or personnel, and to economical considerations weighing against adoption of EDI.

Some large firms, and groups of large firms, conforming to the EDI business model have computer-readable records, application software and computer-oriented business processes conforming to the EDI business model, they garner the benefits of conducting business electronically. Moreover, the benefits increase for these hubs when they conduct transactions on the basis of EDI with as many trading partners as possible. Trading partners comprising the trading community include vendors, customers, and other enterprises involved in commercial transactions such as ports and carriers, for example.

A strong incentive exists for hub enterprises to deal with all their trading partners—whether customers, suppliers or others—exclusively on the basis of EDI. Exclusive use of EDI transactions removes vestigial paper-based information exchanges and the associated redundant processing functions. At an extreme, an ability to send and receive EDI messages becomes a requirement for performing transactions, and conducting any business, with a hub or a spoke enterprise.

Experts in the field of EDI applications and business practice recognize a development of commercial disadvantage as the "small-scale trading partner problem." Firms using EDI employ many commercial inducements and other strategies to enroll smaller trading partners in their EDI communities. However, these prior art solutions all require some use of computer equipment on the site of the small trading partner, or some degree of additional manual intervention in transactions, or both. To date, no single, comprehensive automated system permits the class of small-scale or non-computer-using enterprises to conduct business via EDI messages while accessing benefits of computerized information systems, and continue to use existing paper record-keeping systems. Such a system would let the non-EDI member avoid significant investments in training or equipment.

The United States, European and Asian enterprises are rapidly converting to a model of "electronic commerce." In this model, an ability to send, receive, and use EDI-based data is becoming a requirement for doing business. Firms which cannot participate in EDI-based "electronic commerce" risk isolation from attractive markets. So, in a context of international trade which EDI-equipped hubs and trading communities increasingly dominate, such trading communities are at risk of economic injury.

Therefore, need exists for an independent computer system which permits firms otherwise unequipped for EDI to conduct business via EDI messages. The independent computer system would strive to provide access to the various benefits of computerized information systems, while letting each user use existing paper-based recordkeeping systems and avoid significant investments in training or equipment.

Firms engaging in various commercial transaction commerce need to obtain requests for proposals and provide quotes for goods manufacture and to arrange trade financing (such as letters of credit) and transportation services (such as bills of lading). Such approvals and arrangements are usually obtained and evidenced by paper documents, prepared manually.

This manual, paper-based procedure for getting trade documentation is cumbersome and time-consuming. Timing is important to the enterprises, as coordination of the commercial transaction is critical. Often, the documents are valid for a limited period before expiration. Coordination of documentation with carriers and financiers, along with a multitude of other tasks that include finishing and selling the goods, provides an environment where delays in document processing impinge on the ability of the trader to compete in commerce.

EDI is a method of reducing delays and costs associated with paper-based processing methods. A distinguishing feature of EDI is that an EDI message sent from one computer system to another computer system begins a productive processing event in the second computer. This processing proceeds without intermediate data entry or validation. Examples of such actions in the receiving computer include confirming a user's identity, assigning a shipment to a manufacturing independent computer system, assigning a harmonized code to a commodity description, or debiting an account such as a quota account, for example. An EDI paradigm of information exchange thus permits faster, more accurate, more efficient and thus more economical automated processing of transactions such as letters of credit, bills of lading, request for quotes, purchase orders, invoices and payments. These documents are collectively referred to as forms.

Since a receiving computer treats an EDI message sent to it as input data, a sending computer must strictly validate the data in the message and format the data according to a standard structure. The EDI paradigm therefore requires that outgoing messages meet agreed standards as to format and content. This paradigm also implies presentation of responses and data back to an originator of the transaction.

SUMMARY OF THE INVENTION

The present invention enables users without computers to receive information services from, and send information to independent computer systems. The present invention includes a method and apparatus for converting information contained in a user's writings on paper documents into valid, computer-readable text ready for transmission to one or more independent computer systems. The present invention also includes a method and apparatus for receiving the results of processing from one or more independent computer systems, and for delivering those results directly to the user. The present invention also includes a method and apparatus for further processing of a plurality of such results of processing; and thereby providing additional information services to the user. The method and apparatus includes processes and means for the capture of documents in image form, extraction of characters and data field contents from the image, creation and validation of coded computer readable text, communication with independent computer systems, processing of data received from independent computer systems on behalf of users, and delivery of data and processing results to users unequipped with computers.

Thus, the invention provides a method for simply and efficiently delivering information services between, on the one hand, enterprises unequipped with computers and, on the other hand, networks of computers linked by means of EDI or one or more independent computer systems. The invention does not require use of individual computer systems installed at the user's place of business. The present invention provides each user with benefits of access to transactional and information services available from independent computers. The present invention does not require an investment of time or capital by the small firm in computer hardware or training.

The transactional and information services delivered by the present invention enable small-scale trading firms to reduce time and costs associated with typical commercial transactions. Computer-directed processing of trade-related transactions by financial service firms, carriers, and other large enterprises, reduces the expense of the current manual systems.

Small users benefit from the transactional and information services associated with use of the present invention. Some of the benefits include reductions in operating costs and achievement of greater managerial control.

One model of EDI-based communications incorporates two-way message-passing between enterprises. Several discrete messages make up the documents which today pass discrete fields of information among manufacturers, banks, freight carriers and other enterprises to accomplish authorized international trade. A preferred embodiment processes the transactions that relate to the movement of goods in commerce among enterprises. Operation of the present invention thus provides a substitute for conducting the paper-based transactions now required of firms seeking to engage in commerce.

It is one feature of the present invention to provide for feedback from the data and EDI message transmission process to validate and perfect the data extracted from the document.

One aspect of the invention includes devices for sending and receiving document images. Such devices include members of the class of simple and commonly available facsimile (fax) machines which communicate to a complement of an embodiment's apparatus by a public switched telephone-grade network. Facsimile machines typically transmit binary images of fixed resolutions in compressed formats at speeds governed by paper transport. Such image devices also include members of the class of more complex image scanners (including associated control and storage computers). Scanners are capable of sending grey-scale images at high resolutions at speeds governed by the transmission medium. Various image transmission devices placed in selected public locations improve access to the system for users not having access to their own imagers. Most users, having infrequent or low-volume demand for document scanning and data inquiry, use scanners located in privacy booths at neighborhood storefront locations open to the public. An advantage of using fax machines as input devices for the system relates to a fax machine's prevalence in the offices of the users. Users employ more fax machines in their businesses than computers. Fax machines are less expensive and are simpler to learn to use.

One embodiment of the invention includes additional devices for signaling and sending data to the user. For example telephonic voice-response systems operating as a service over the public telephone system, radio-broadcast paging systems, and networked computer display terminals provide feedback to the user.

The user uses the imager and other send/receive devices to scan documents into digital images, to alter, correct, or authorize release of submitted transactions, and to receive signals from the system. The imager sends the users' images and data from a population of imagers widely dispersed throughout a geographic area. A plurality of computing sub-systems making up a preferred embodiment of the present invention perform main processing functions at a central location. In some embodiments, remote locations controlled from the central processing site perform some ancillary processing functions.

One aspect of the invention includes devices that receive and secure images and data from a multiplicity of image sending devices. These devices manage the multiple connections to the public switched network or dedicated data lines. These devices also receive images and data, and store them on magnetic or other digital storage media.

One aspect of the invention includes a character and data field extracting mechanism to analyze a received image and establish the information conveyed by the image.

The extracting mechanism includes character recognition and pattern analysis, as well as image enhancement and database queries which determine character and data field values for the received image. User profile data associated with the user's transaction helps efficient and accurate determination of a large percentage of the character and field data.

The system requires manual keying by human operators of unrecognized data or data having a confidence level below a predetermined threshold. The system presents images of complete document pages or system-selected portions of document pages (known as "image snippets" or simply "snippets") on video display screens to operators. Displaying the snippet permits visual determination as to proper values for unrecognized data.

The system assembles the character and data fields, through queries of the user profiles and other information, into EDI messages. Each EDI message is validated at two levels, the individual character and data fields separate from the compiled message.

An apparatus including a preferred embodiment has a local area network including an image and data server, a telecommunications controller, an image processing controller, and a data processing controller. The image and data server provides storage and retrieval services for the other components of the system.

The telecommunications controller manages receipt of image and data information from a user and transmissions of EDI messages and image information to an independent computer or to the user.

The image processing controller analyzes received images to extract character and field data. This extraction can include character and word recognition, database look-up and cross-verification or snippet display and manual key entry, for example. The image processing controller produces image information in a computer readable form, as well as confidence data, template data and audit data associated with the image information.

The data processing controller works cooperatively with the image processing controller to provide context frames used in the extraction process. Additionally, the data processing controller composes, validates and tracks the computer transactions or EDI messages. Additionally, the data processing controller executes particular business applications of value to the user. For example, such an application would track the status of receipt and processing of bills of lading or purchase orders, or of the level of inventory compared with expected production.

In operation, a user sends an electronic encoded image of a completed transaction request. A telecommunications system receives and transmits the request and a data processing system verifies registration of the user with the service through use of a software application. After verifying registration, the telecommunication controller receives the transmitted image and passes this image onto the image and data server for storage.

When it is time to process the image, an application of the host applications software controller starts processing of the received image. The image and data server passes the image to the image processing controller which extracts character and data fields from the image. In addition, information extracted from the field accesses a user profile to improve extraction speed and accuracy. The image processing controller provides the data processing controller with the extracted information to complete a file of coded text or one or more EDI messages.

The data processing controller composes files of coded text strings or EDI messages from the information provided by the image processing controller. During compilation of information for files of coded text or EDI messages, the data processing controller tests the information. In some instances, the data processing controller requests additional information or processing activities from the image processing controller, processing the received image to help validate or perfect the file of coded text or EDI messages.

After composing the file of coded text or valid EDI messages, the data processing controller passes the text or messages to the image and data server for storage as well as to the telecommunications controller for transmission to the independent computer. In one embodiment, the transmission is over an EDI network.

The system of the preferred embodiment allows each user to use the resources and advantages of computer network without acquiring a computer system. Simple transmission of an image of a completed form starts the creation and transmission of valid computer data. Likewise, the results of computer data processing can be simply transmitted and displayed to a user unequipped with the computers required by the prior art.

Reference to the remaining portions of the specification and the drawing may realize a further understanding of the nature and advantages of the present invention.

BRIEF DESCRIPTION OF THE DRAWINGS

FIG. 11 is a representative form designed for use according to the preferred embodiment of the invention.

DESCRIPTION OF THE PREFERRED EMBODIMENT

Figure 1:
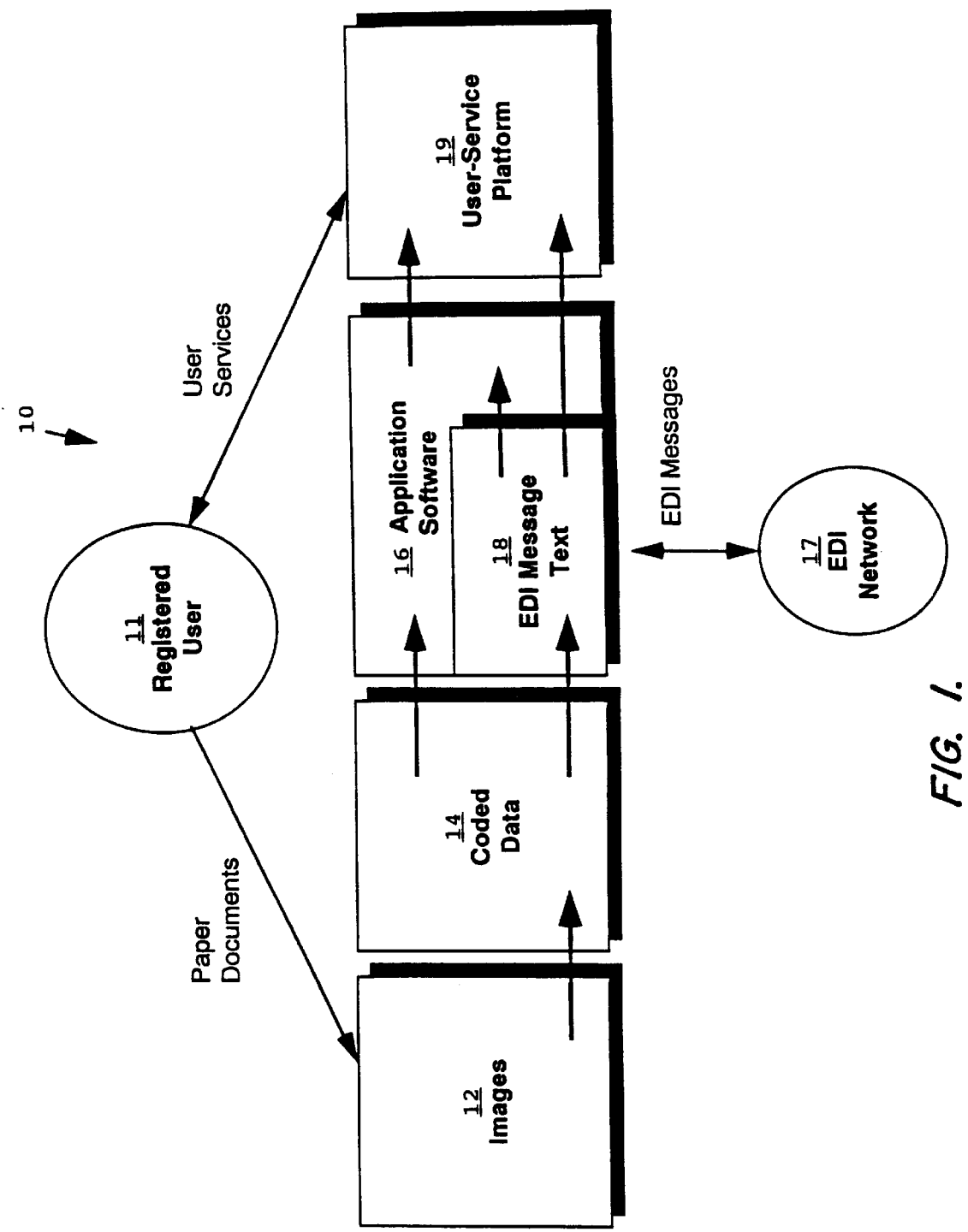
FIG. 1 is a state transformation diagram of a system 10 illustrating general application of a preferred embodiment of the present invention to a flow of data across an interface between paper documents and an EDI network.

FIG. 1 is a state transformation diagram of a system 10 illustrating a flow of data between paper documents and an EDI network in a general application of a preferred embodiment of the present invention. The state transformation includes a registered user 11 providing an image 12 in electronic form to a system 10. A coded text string 14 corresponding to information extracted and developed from the image 12 has two uses: 1) an application software 16 processes the coded data directly for various system features, or 2) a specialized application software 16 validates and converts the coded text 14 into valid EDI message text 18. An EDI network 17 receives the validated EDI message text 18 for distribution and routing in a well-known manner. Additionally, the EDI network 17 makes EDI message text 18 available to the application software 16. Application software 16 accumulates and transforms coded data 14 and data extracted from EDI message text 18 to create management information of particular business value to the registered user.

A user-service platform 19 interfaces with the application software 16 and with the EDI message text 18 to acquire information on behalf of the user and to perform subsequent processing on the information including delivery, formatting, and presentation of EDI message text 18 and management information created by application software 16. As described, the information the user 11 records on a paper document is successively transformed into various states through the system 10. In image form 12, any number of imaging formats is available, for example, PCX, TIFF, GIF, CCITT, etc. as well known in the art. The coded data 14 is available likewise in any number of computer-useable formats, for example American Standard Code for Information Interchange (ASCII) or Extended Binary-Coded Decimal Interchange Code (EBCDIC). An EDI message transmitted on an EDI network contains additional information about the transaction. Thus, one advantage of the present invention is accurate and efficient transformation of a hard-copy document into computer-intelligible coded data that is valid and contains additional transactional information. The following description further elaborates upon these complex transformation stages.

Figure 2:
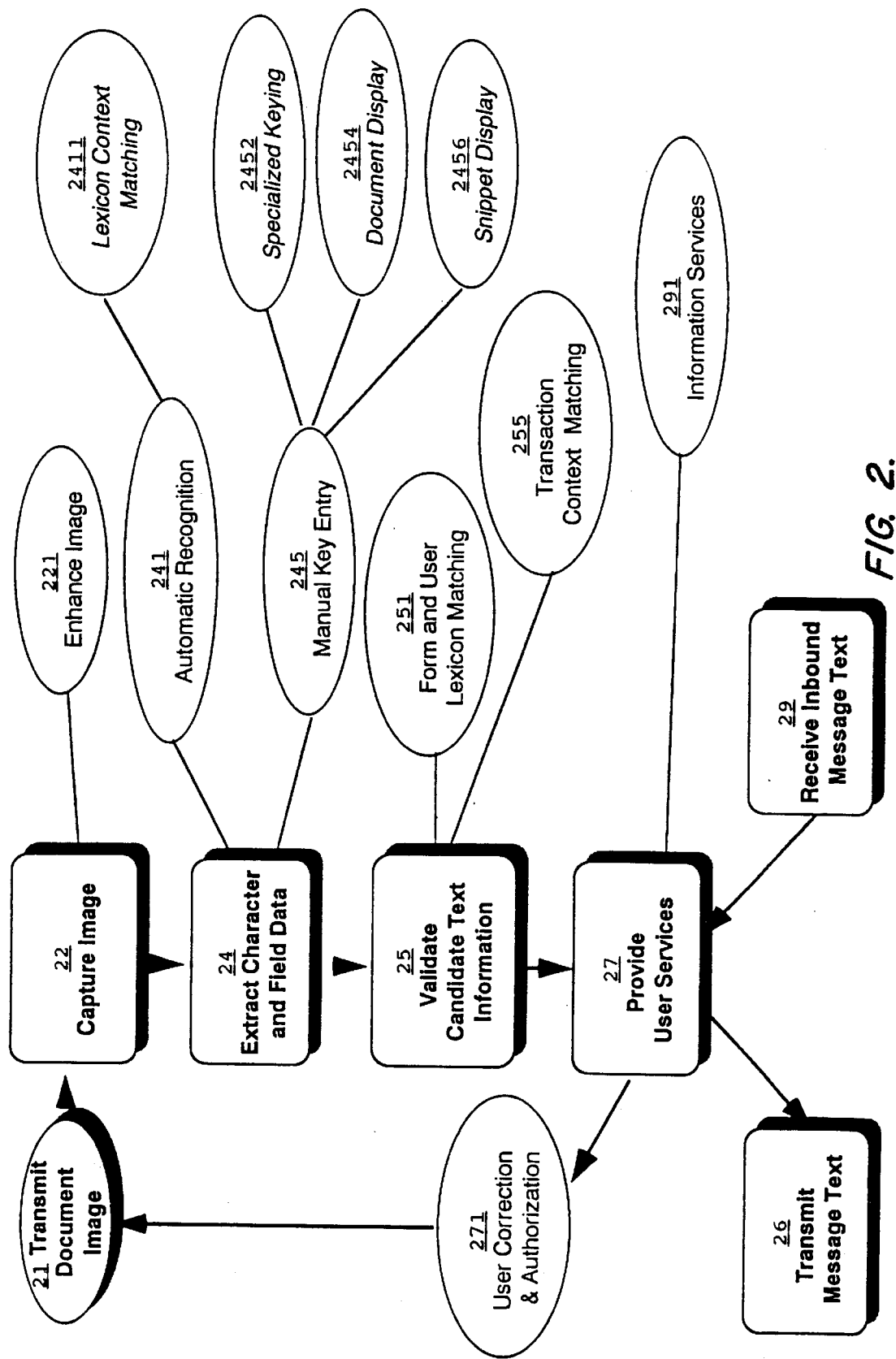
FIG. 2 illustrates a sequence of information processing steps encompassed by the present invention.

FIG. 2 illustrates a sequence of information processing steps encompassed by the present invention for conversion of a hard-copy document into the various states identified in FIG. 1. The sequence of information processing includes seven main steps: transmit document image 21, capture image 22, extract character and field data 24, validate candidate text information 25, transmit message text 26, provide user services 27 and receive inbound message text 29. Arrows indicate a flow of image and coded data through a system embodying the present invention. Additional related subsidiary processes of this preferred embodiment include: enhance image 221, automatic recognition 241, lexicon context matching 2411, manual key entry 245, specialized keying 2452, document display 2454, snippet display 2456, form and user lexicon matching 251, transaction context matching 255, user correction and authorization 271, and information services 291.

The system 10 in FIG. 1 operates in response to a user transmitting an electronic image of a document, step 21. A user uses a pre-printed form obtained during registration. The user may transmit an electronic image in any manner provided the format is compatible with the receiving unit. The preferred embodiment provides for transmission either by using fax machines or more complex scanners coupled to a communication system.

The system 10 in FIG. 1 captures the facsimile image at step 22. A receiver/transmitter temporarily stores the facsimile image, decompresses it if necessary, applies conventional character-recognition technology to a registration-number portion of the electronic image. The system verifies registration through use of the number, as well as identifying a particular user transmitting the particular document. A simple look-up file, accessed by the registration number, establishes a particular user's registration and identity. The receiver/transmitter acknowledges receipt of the image upon identification of the user as a registered user. Step 22 image capturing includes any long-term image storage, such as for audit purposes, using conventional image storage technology. The image capture step 22 optionally includes a step 221 for enhancing the captured image to facilitate subsequent feature recognition by machines and human operators.

Various image processing techniques receive the captured and enhanced image and operate to extract character and field data at step 24. Automatic computer-based recognition processes 241, supplemented with manual, human-based key entry processes 245, render candidate computer-readable text from the bit-mapped image captured at step 22. Dividing the extraction tasks into automatic and manual parts is one feature of the present invention to promote speed and efficiency. The present invention balances the recognition accuracy of manual keying with the speed of automatic recognition to ensure that the system processes the large number of images as fast and as accurately as possible. In other words, contrary to conventional systems, the present invention optimally incorporates manual-keying into its design. Automatic recognition includes lexicon context matching which is a software process for dynamically building a set of target values. The manual key entry 245 includes a specialized keying step 2452, a document display step 2454, and a snippet display step 2456.

Step 25 perfects and validates the candidate text of step 24. Step 25 includes related processes: 1) form and user lexicon matching at step 251 and 2) transaction context matching at step 255. These two processes iteratively extract pertinent features from the document image and create the computer codes corresponding to the business transaction intended and indicated by the information regarding the document form type and the identity of the registered user at step 251, together with information regarding a state of current and previous transactions help in extracting the intended meaning of various features of the document image. Cross-checking between the different information sources validates and perfects the information.

User services, step 27, performs desired functions with the extracted and validated textual information. One user service, user correction and authorization at step 271, transmits a turn-around document to the user. The turn-around document is a representative document including the extracted and validated information the system 10 (FIG. 1) determined from the information the user provided. The turn-around document includes correction indication marks for specific fields. Transmitting the turn-around document back to the system 10 (FIG. 1) at step 21 indicates either approval or the desired changes to the information presented in the turn-around document. The user input overrides the extracted data. The system 10 (FIG. 1) uses the user updates to dynamically adjust and customize the validation processes 251 (FIG. 2) and 255 associated with the particular user. Thus, as the user continues to use the system 10 (FIG. 1), the system 10 dynamically updates the information about the user to improve the extraction and validation processes for documents the user subsequently submits.

After obtaining approval for the extracted and validated data, the system 10 (FIG. 1) transmits a file of coded text or a EDI message text assembled from the authorized text at step 26 (FIG. 2). The system 10 (FIG. 1) transmits the desired information to an independent computer system either directly or over a network.

The user services process 27 will also process information received from the independent computer at step 29. The system 10 (FIG. 1) reformats any received messages destined for a particular user into a suitable format before transmitting it to the user. The user services process 27 may perform additional processing at step 291 on data or messages received from independent computers to produce management information of particular value to the individual user. Individual messages or management information are printed either on high-quality paper stock at a local office or directly to a personal fax machine of the user's choice. The system 10 (FIG. 1) permits the user to receive this management information without requiring the use of a computer.

Figure 3:
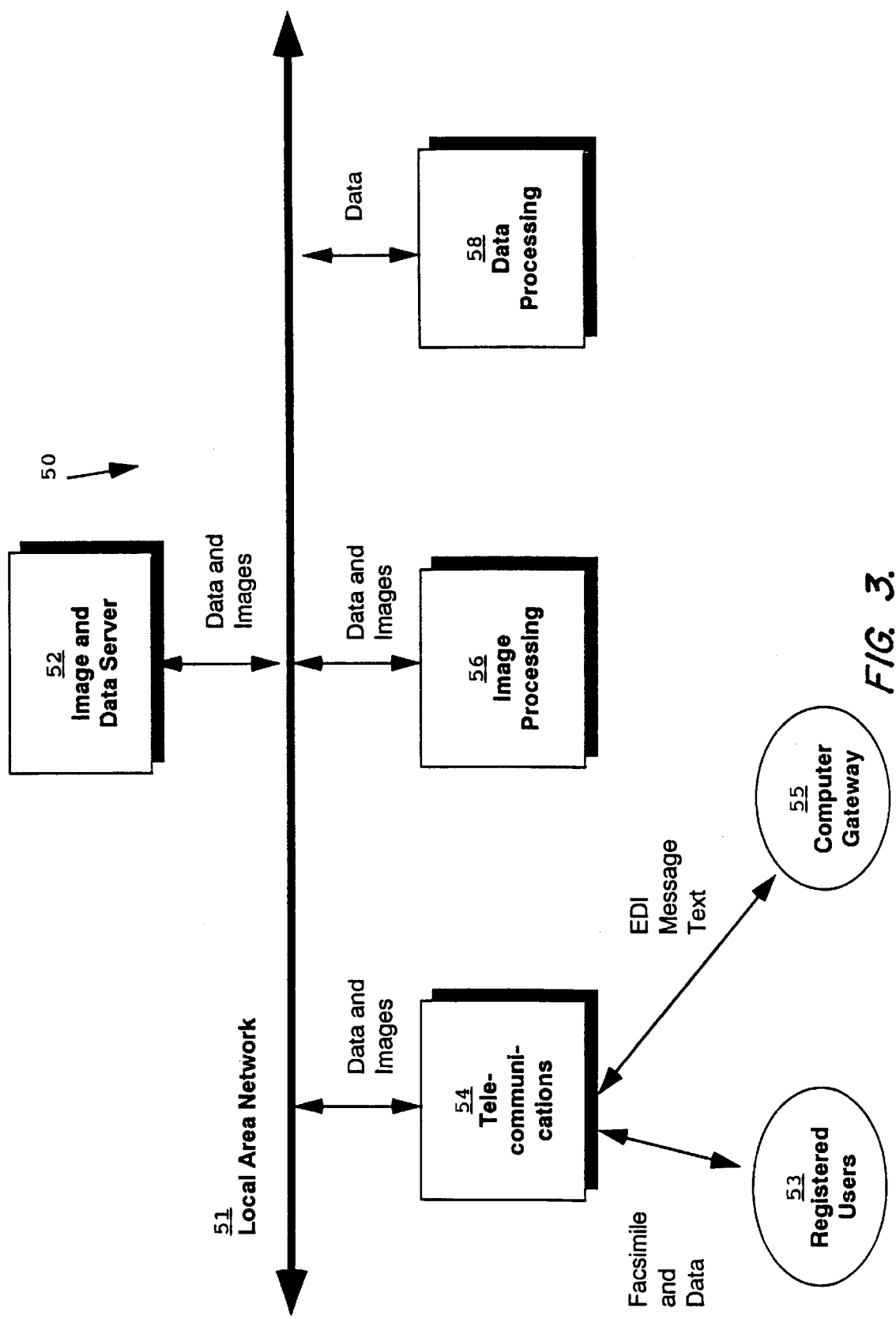
FIG. 3 is a block diagram of a computer system 50 according to a preferred embodiment of the present invention.

FIG. 3 is a block diagram of a computer system 50 according to a preferred embodiment of the present invention implementing the process system 10 (FIG. 1). The computer system 50's (FIG. 3) architecture includes the well-known client/server architecture implemented as a high-speed local area network 51. The client/server architecture includes several processing units configured with software and hardware to optimally perform particular identified functions. The computer system includes an image and data server 52, a telecommunications processor 54, an image processing unit 56, and a data processing unit 58.

The image and data server 52 provides central storage and system control. The telecommunications processor provides telecommunications control and temporary storage, including gathering and dispensing of images, as well as communications to remote computers and/or computer networks 55 and the registered users 53. The image processing unit 56 performs dedicated computationally-intensive manipulation and decoding of digital images. The data processing unit 58 stores and applies context data to enable accurate rendering and extraction of coded computer text from bitmap images of the various trade documents. The local area network 51 provides communications among the elements of the computer system 50 using the Transmission Control Protocol/Internet Protocol (TCP/IP).

Figure 4:
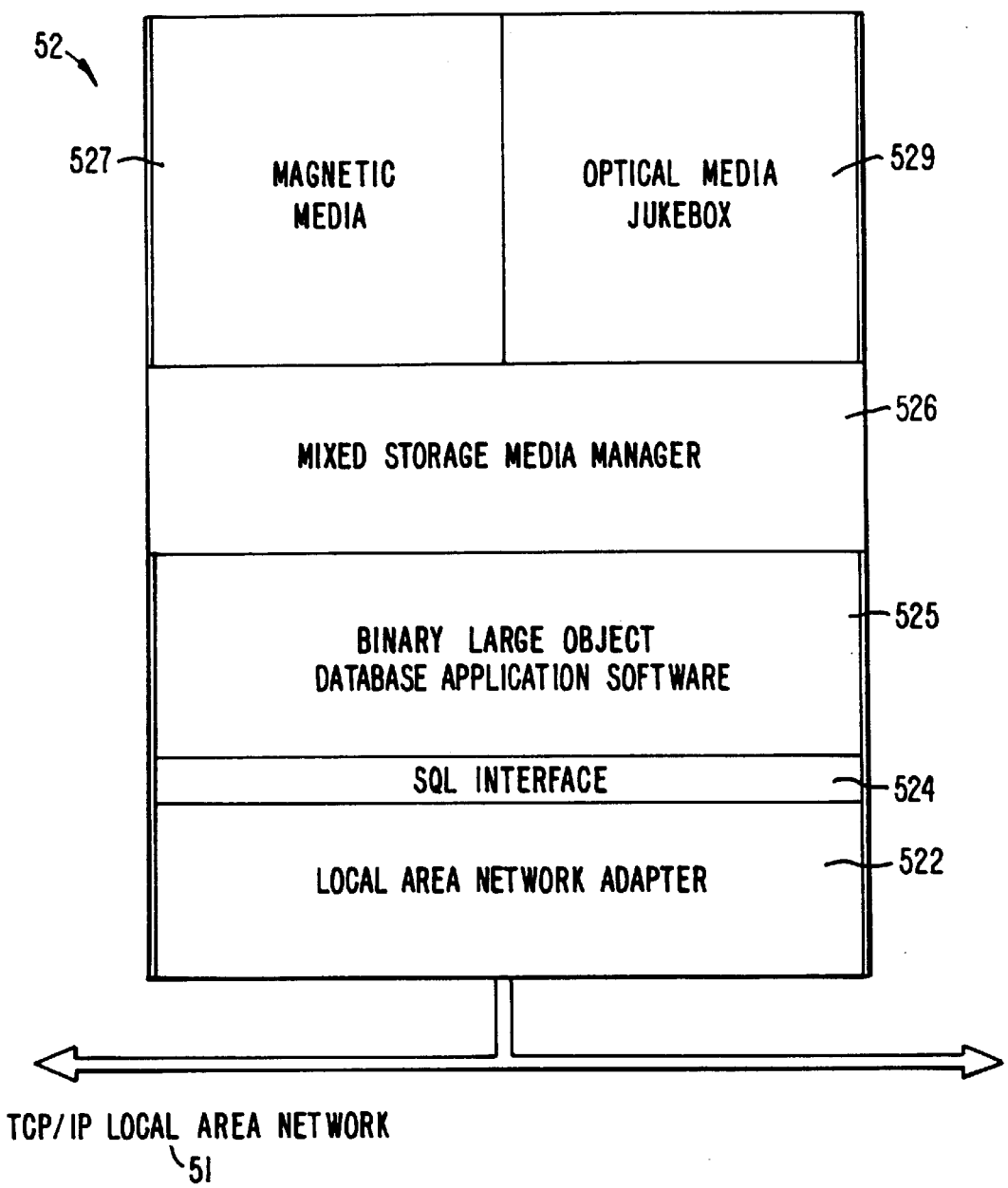
FIG. 4 is a block diagram of the image and data server 52.

FIG. 4 is a block diagram of the image and data server 52. The image and data server connects to a remainder of the computer system 50 through the local area network 52. A local area network adapter 522 maintains a physical connection and data-communication pathway to the server's central processing units.

In the preferred embodiment, the image and data server 52 operates a process for storing data and image objects in a single database. This database, known as a Binary Large Object Database Application 525, is commercially available from Informix Software Inc., Menlo Park, Calif. The database permits a single access method to store and retrieve both data and image objects. A Structured Query Language (SQL) interface employing a SQL protocol provides translations between the local area network adapter 522 and the database application 525.

A mixed storage media manager 526 addresses both mountable and demountable magnetic media 527 and optical media 529. The media manager 526 responds to commands from the database application 525 for storing and retrieving the data and image objects. The magnetic media 527 includes conventional magnetic storage disk drives. The optical media 529 includes conventional optical disk storage mounted within a retrieval robot.

Figure 5:
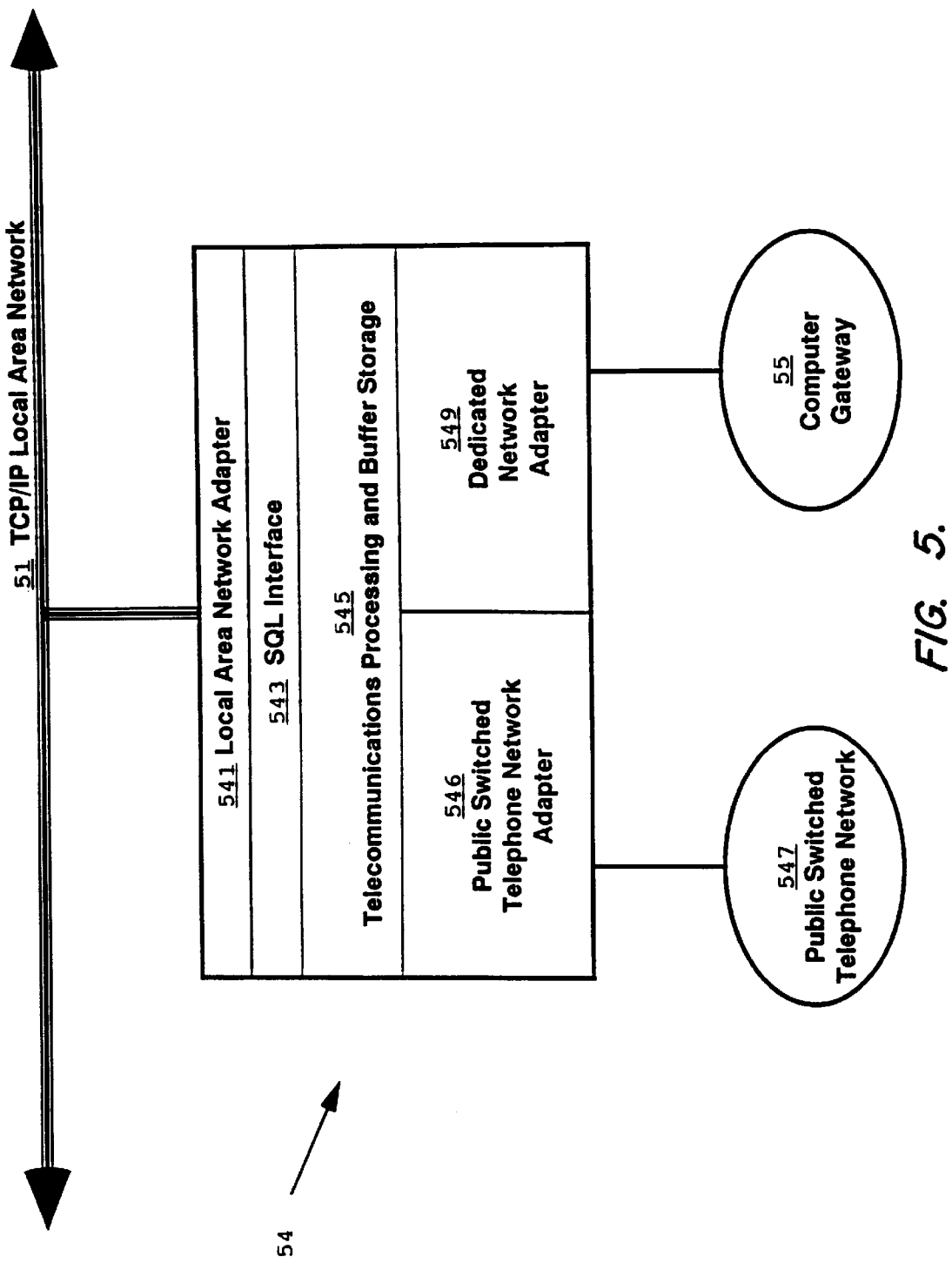
FIG. 5 is a block diagram of the telecommunications unit 54.

FIG. 5 is a block diagram of the telecommunications unit 54. The telecommunications unit 54 includes a local area network adapter 541 connected to a SQL interface 543 connected in turn to a telecommunications processing and buffer storage 545. The telecommunications processing and buffer storage connects to both a public switched telephone network adapter 546 and a dedicated EDI network adapter 549. The adapter 541 maintains the physical and logical connection to the local area network 51. The telecommunications processing and buffer storage 545 is a process operating on the telecommunications unit 54 in the preferred embodiment. The telecommunications processing and buffer storage application 545 is a semi-custom software suite that exchanges information with the other elements of the computer system 50 (FIG. 3). The telecommunications processing and buffer storage application 545 uses the SQL interface 543 to send and receive database queries to and from the image and data server 52 (FIG. 4).

The telecommunications processing and buffer storage application 545 (FIG. 5) regulates and controls a flow of data to and from the external connections public switched network adapter 547 and the dedicated network adapter 549. The telecommunications processing and buffer storage application 545 dispatches data and image files from and to the other processing units of the computer system 50. It also initiates and terminates communication sessions.

The network adapters 546 and 549 are commercially available software products providing physical connection and transport-level switching, error correction, and session management services. An examples of an acceptable software product for the processing, buffering and adapters is Simple Mail Transfer Protocol, available from University of California Berkeley Systems Distribution, Berkeley, Calif.

A public switched telephone network 547 connects to the telecommunications unit 54 preferably via multiple data-grade, high bandwidth lines. One node on this network 547 can serve remote manual key-entry terminals. The computer gateway 55 connects to the telecommunications unit via dedicated port access with files transferred in batch mode.

Figure 6:
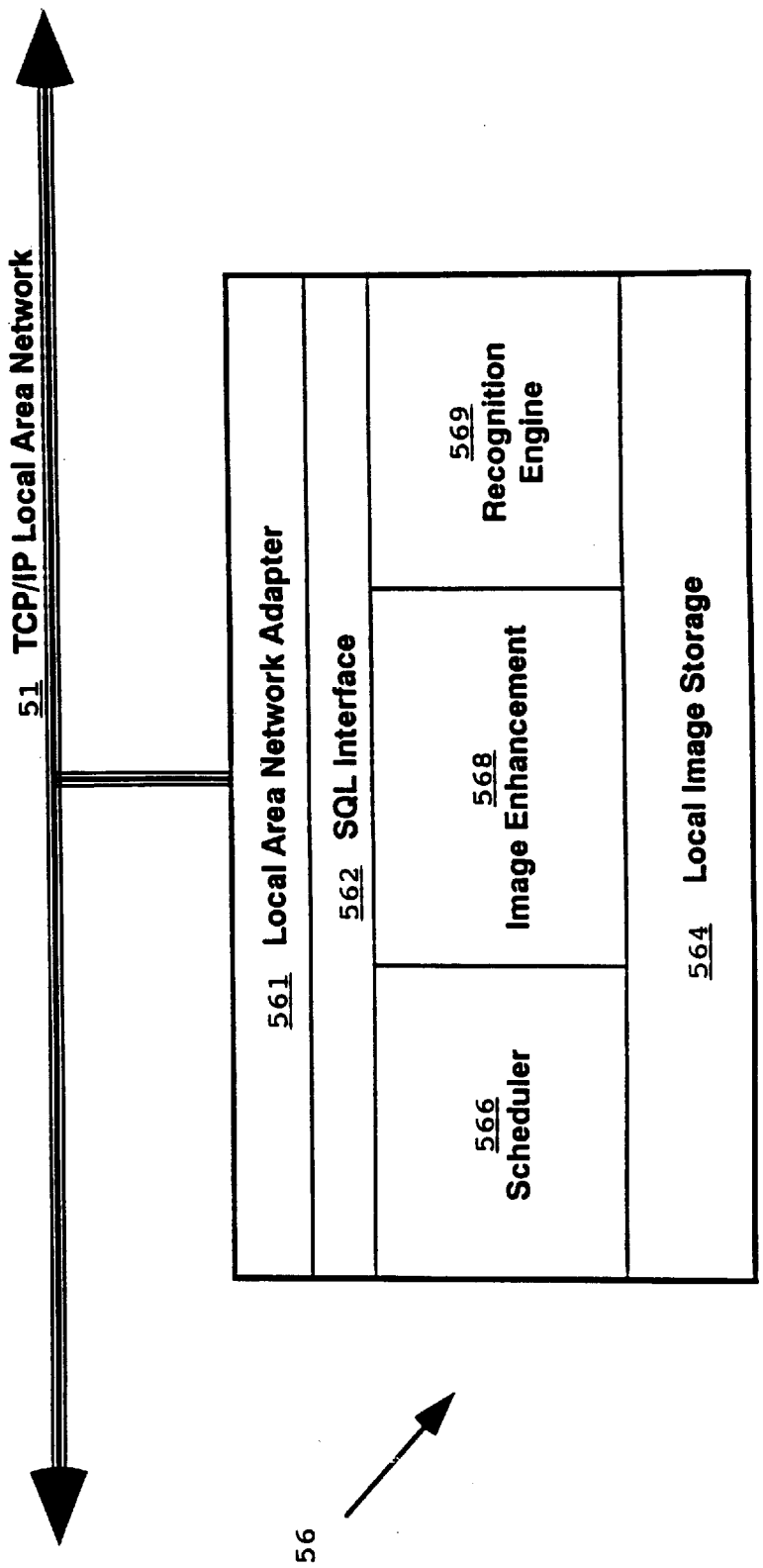
FIG. 6 is a block diagram of the image processing unit 56.

FIG. 6 is a block diagram of the image processing unit 56. The image processing unit 56 includes a local area network adapter 561 connected to a SQL interface 562, connected in turn to three image processing applications: 1) a scheduler 566, 2) an image enhancement application 568, and 3) a recognition engine 569. These processes use a local image storage 564 to temporarily hold images prior to enhancement, recognition or restorage on the image and data server 52.

The scheduler 566 is a software suite that accepts prioritized requests from other processes running on other processors, estimates the processing time required to fulfill each request, creates work queues of requests, and dispatches queue members to the image enhancement application 568 and the recognition engine 569, as appropriate.

The image enhancement application 568 is a software suite that deskews document images, removes gross-level noise, and normalizes images for variations in capture-motor speed. The image enhancement application 568 is optimized for speed.

The recognition engine 569 is a software suite that dispatches image snippets containing individual characters, fields or document zones to commercially-available recognition firmware, or to a human operator for display and manual keying. The individual firmware devices employ techniques that include pattern matching, feature analysis, and neural network recognition systems.

Figure 7:
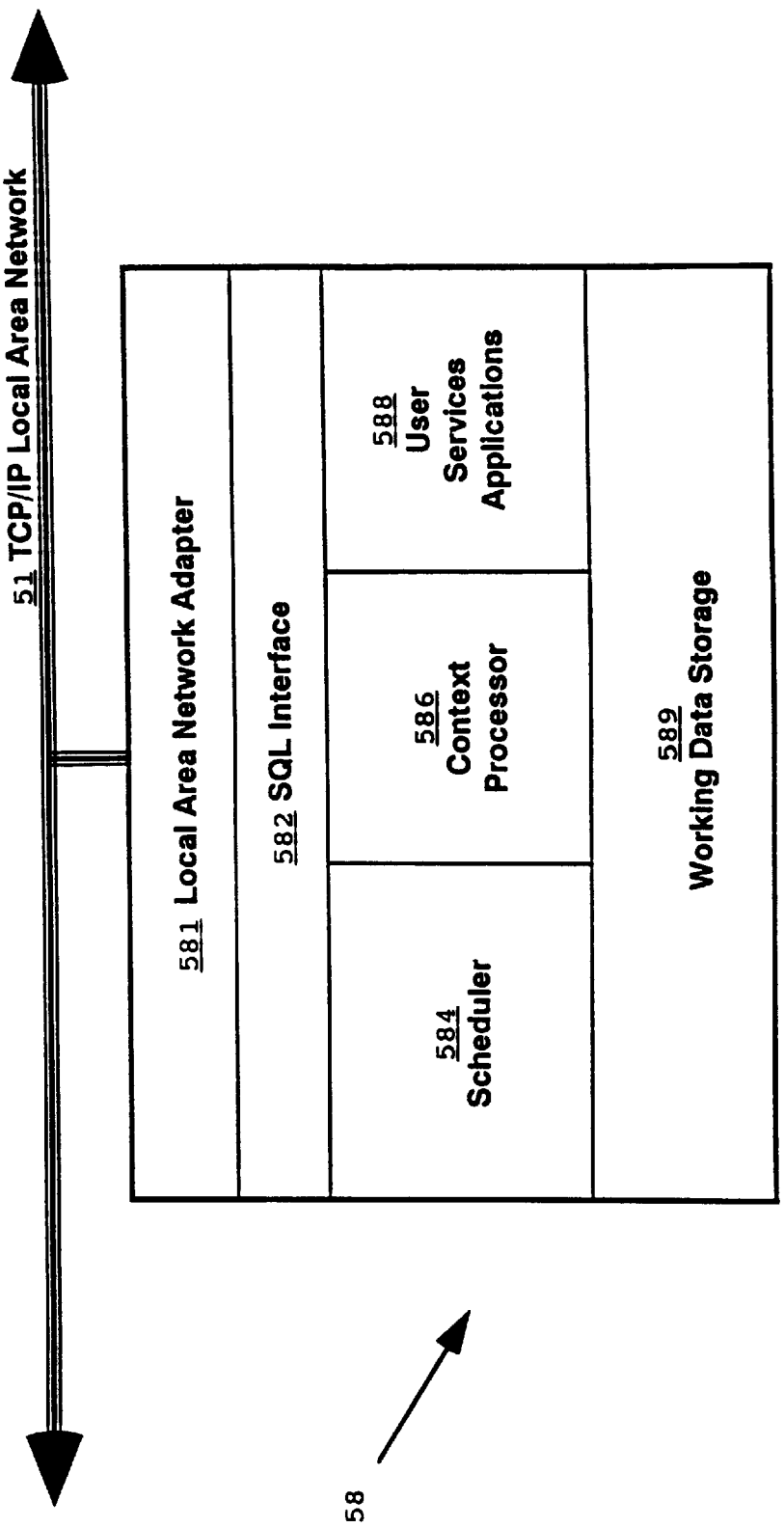
FIG. 7 is a block diagram of the data processing unit 58.

FIG. 7 is a block diagram of the data processing unit 58. The data processing unit 58 includes a local area network adapter 581 connected to a SQL interface 582, connected in turn to three data processing applications: 1) a scheduler 584, 2) a context processor 586, and 3) user services applications 588. These processes use a local working data storage 589 to temporarily hold data for the data processing applications.

These applications process the coded computer data used by the present invention. They use the SQL interface 582 to send and receive database queries to and from the image and data server 52 (FIG. 4).

The scheduler 584 (FIG. 7) is a software suite that accepts prioritized requests from other processes, estimates the processing time required to fulfill each request, creates work queues of requests, and dispatches queue members to the context processor 586 and particular code objects within the user services applications 588, as appropriate.

The context processor is a software suite that works cooperatively with the image processing unit 56 of FIG. 6 to extract character and field meaning from bitmap images. This process applies context data to particular candidate characters, fields, document-types or transactions to determine confidence levels. The context processor 586 also compares confidence levels to established thresholds and applies user validations. The character and field data is in bit-mapped image representations of the original writings. Furthermore, as the layout of the pre-printed document form is a representation of the known character and data fields and of the transaction type being attempted, the identity of the document form indicates both the transaction underway and the range of possible data values and text content for a single, valid computer-readable text record. Furthermore, once the computer system 50 (FIG. 3) determines the identity of the registered user, the computer system 50 (FIG. 3) uses the identity to retrieve a record of past activity. This record provides information to assist in extracting new character and field data. The record indicates a sequence of prior completed transactions, each associated with singular, valid computer-readable text records. The range of possible text records is thereby narrowed. Furthermore, the combination of an identified user and an identified transaction indicates an even narrower range of singular, valid computer-readable text records. Hence, the invention selects context information from four successive levels of information (alphabet, form, user, and transaction) to provide a narrow lexicon for accurate automatic conversion of bitmap images to a text record.

The user services applications environment 588 is a library of software applications that use pluralities of coded text received from independent computer systems to provide management information to users.

Figure 8:
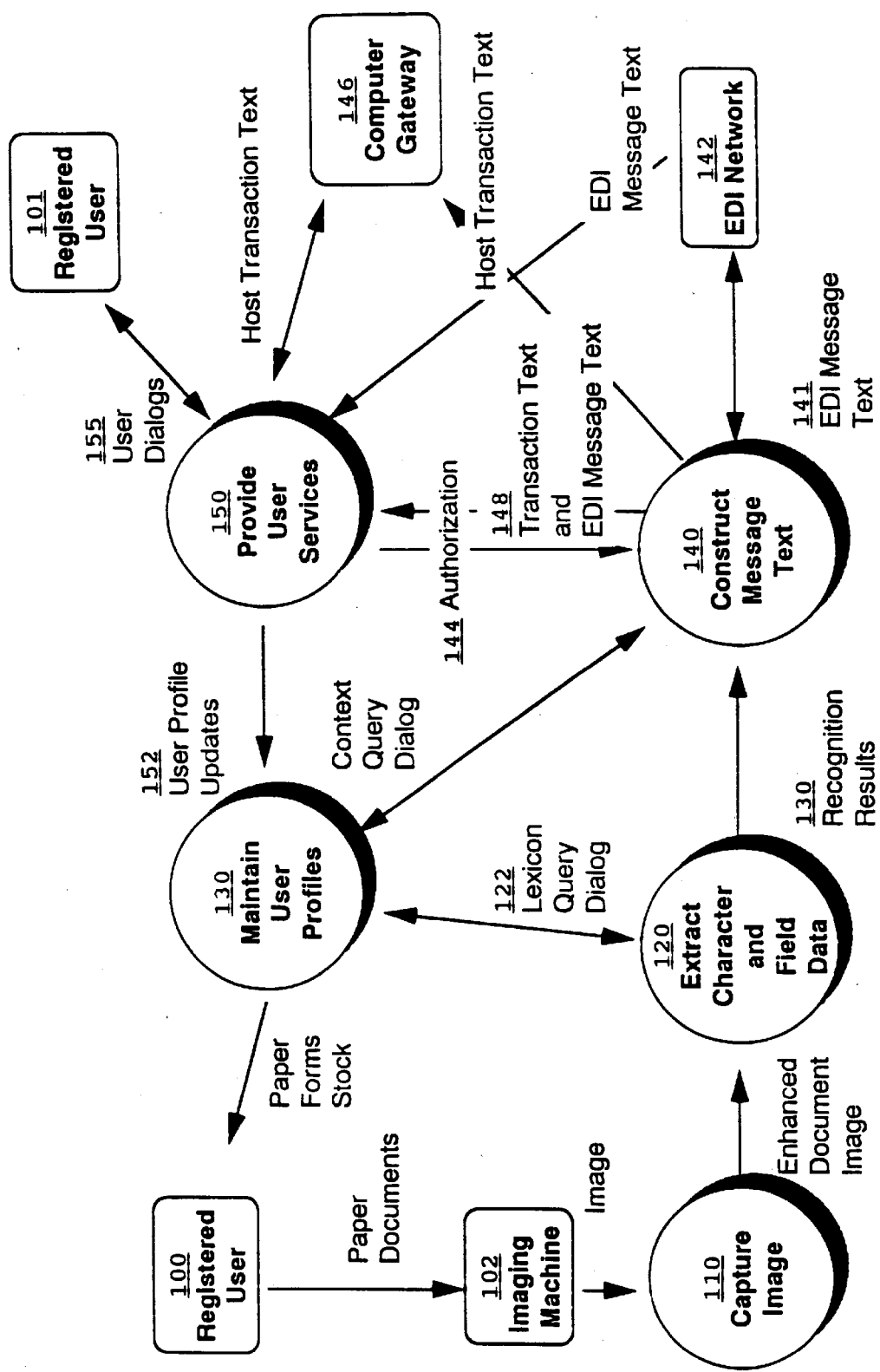
FIG. 8 is a system process flow diagram for a preferred embodiment of the present invention.

FIG. 8 is a process flow diagram for a preferred embodiment of the present invention illustrating operation of the computer system 50 (FIG. 3). Each transaction originates with a registered user 100 completing a hardcopy of a particular transaction request. The user, by use of an imaging machine 102 (fax machine or scanner) converts the paper document into an electronic rasterized image of the completed paper document. The facsimile machine 102 sends the fax image to the computer system 10. A multi-gray scale scanner is preferable for imaging because it enables more accurate feature extraction. Gray-scale scanners are also a magnitude of cost more expensive so are not as available to users as conventional black and white imaging fax machines.

The telecommunications processor 54 (FIG. 5) captures the fax image at 110. As imaging machines compress the images to decrease transmissions times, the telecommunications processor has the ability to decompress the images to restore the rasterized image. The telecommunications processor sends the captured image to the image and data server 52 (FIG. 5) for storage and to the image processor 56 for enhancement. The telecommunications processor 52 uses the scheduler 566 of the image processor 56 to schedule enhancement of the image via the image enhancement application 568.

A character and field data extraction process 120 (FIG. 8) receives the rasterized image from the image capture process 110. Each completed paper document submitted to the computer system 50 (FIG. 3) includes a plurality of known character and data fields. The subsequent fax image of the completed paper document includes the same character and field data in a format that is not computer readable. As one object of the present invention is to create a business transaction, evidenced in the equivalent by a singular record of computer-readable text, the object of the working of the combination of software processes extract character and field data 120, message text construction 140 and user profile maintenance 130 is a selection of a singular computer-readable text record that accurately reflects a content of the original writings.

Figure 9:
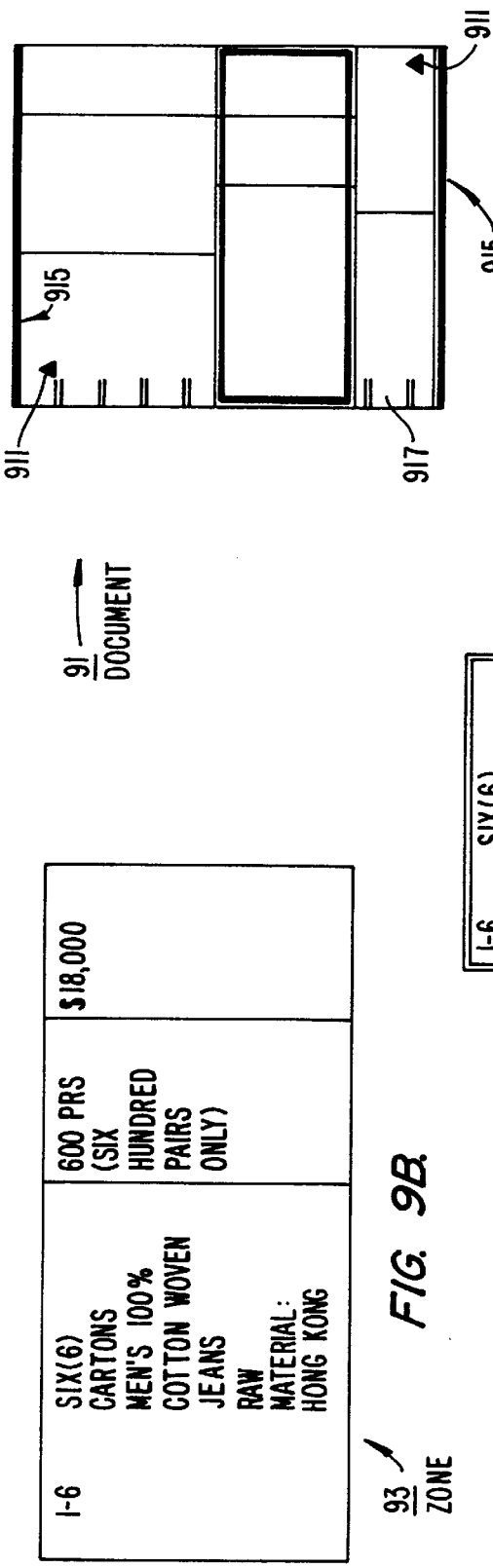
FIG. 9 is an illustration of the feature recognition processes employed by the invention.

FIG. 9 is a representative illustration of a specific implementation of one example of feature recognition process for a document 91 according to a preferred embodiment of the present invention. Each document 91 is a pre-printed form supplied by a system operator to registered users. The document 91 has a known size, field layout and configuration of ruled lines.

Some images have skewed character and field data introduced during the imaging processing. Deskewing of these character and field data facilitates subsequent recognition processing of the document 91. A pair of document landmarks 911 as opposite corners of the document 91 assist in the deskewing operation. The landmarks 911 are known character shapes positioned in a known relationship relative to document 91 edges including a text number. Deskewing processes examine small regions of the fax image in expected areas of the landmark locations to determine the location of the landmarks relative to the apparent document edges 915. Given the detected landmark location relative to the apparent document edges 915, a skew angle is computed for the fax image. If the skew angle is more than a system tolerance for skew, the image is corrected by offsetting adjacent scan lines by one or more pixels. The calculated skew angle is then stored in the image file header.

Each document 91 is classified as one of a plurality of known document forms by sending the landmark image to the recognition engine 569 (FIG. 6) and using a resulting character code returned to look up a particular document type from a table of document types.

Removing imaging velocity distortions in feature shapes assists in subsequent feature recognition. Commercially available fax machines distort feature shapes along a feed axis through small, but significant, speed variations in a speed of a paper-feed drive motor. The feature distortion arising from speed variations occur at random. Tic marks 917 (FIG. 9) printed on the document 91 at approximately two centimeter intervals assist in correcting for speed distortion. The computer system 10 detects the tic marks 917 in the fax image and compares the apparent separation to the known separation. If the distance, measured in scan lines, between consecutive tic marks 917 is less than standard, then the system 10 adds one or more scan lines to the corresponding region of the fax image. These scan lines are added by copying the contents of the single scan line, selected from all scan lines in the region between the two current tic marks 917, containing the most black pixels and inserting the copy just above it. A similar but opposite procedure is used if distance between consecutive tic marks 917 is greater than standard.

Redesigning each particular form to improve character and field data extraction is one important part of the present invention. This includes font type and size, provision of boxes and fields to position and constrain handwriting and specification of paper color and ink color.

Figure 11:
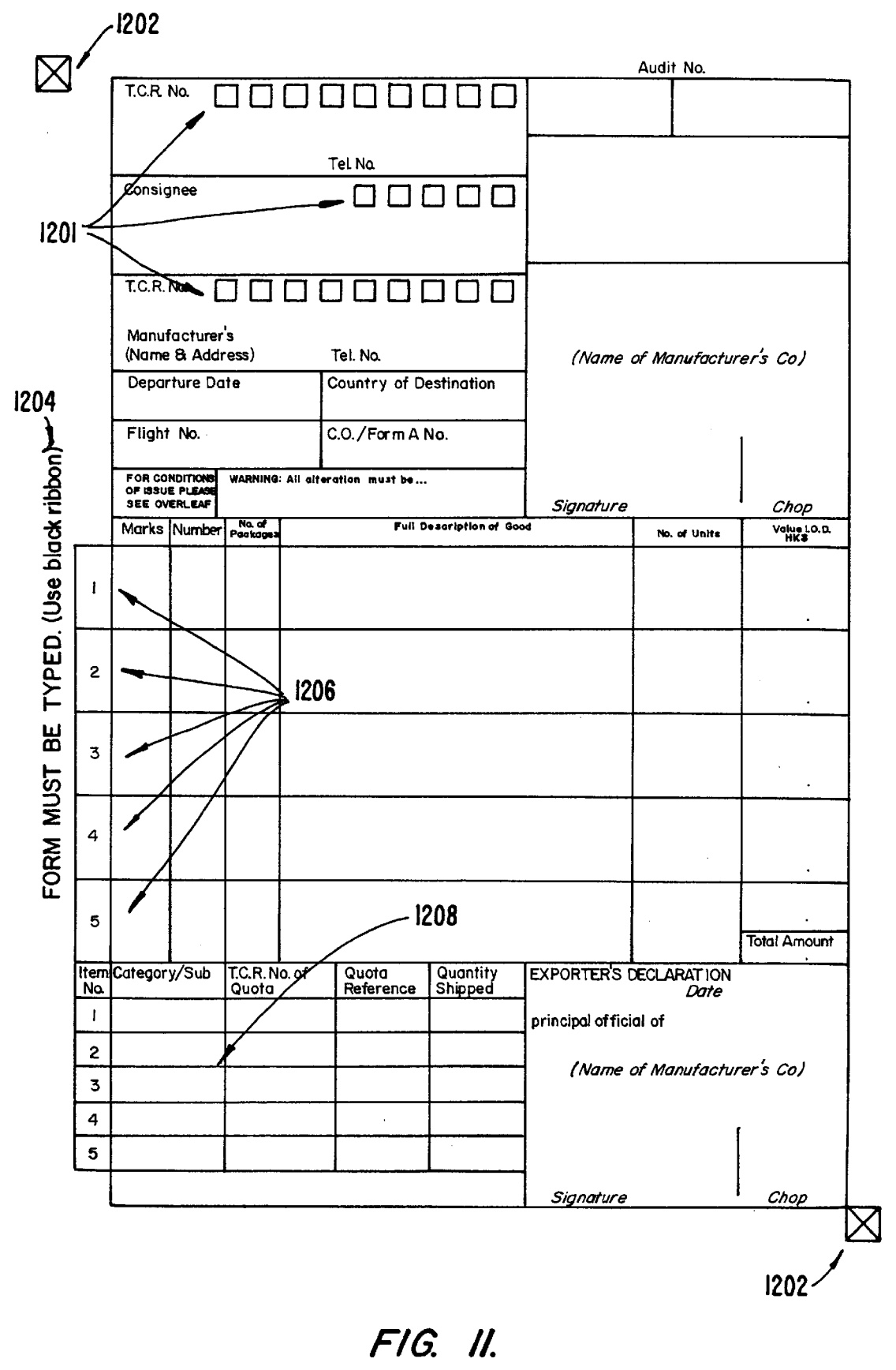

FIG. 11 is a representative one such form designed for use according to the preferred embodiment of the invention. Boxing of characters in fields 1201 ensures character separation. Contents of fields 1201 supplant previously typewritten text with code numbers referencing, for example, user identity, consignee identity, and registration number. Space below the boxed fields 1201 allows optional inclusion of typewritten, printed, or stamped human-readable text, if the user desires. Instructions 1204 request use of dark ink, in this example. Fields 1206 constrain and delineate text blocks, and request the user to write related coded data in numerics in fields 1208. Other forms include check boxes, in place of previously written information.

FIG. 9 illustrates dissection of each document 91 into a plurality of zone images 93 which facilitates character recognition. Identification of scan lines, or portions thereof, defining a rectangle corresponding to known regions on the document define each zone image 93. The system further defines fields 95 for particular ones of the zones 93. Identification of scan lines define the fields or pre-printed rule lines define the field boundaries.

The document 91, the zone 93, and the field 95 contain data 97. The data 97 is produced by application of well-known character recognition techniques. Pattern-matching, feature-vector, and neural network recognition techniques are used to perform a first pass at extraction of a first set of the characters comprising data fields.

Extraction is accomplished at two levels of decoding the bitmap images into coded computer text: at the level of alphanumeric characters within zones on the overall document bitmap; and at the level of complete fields composed of strings of characters which together have meaning. If character recognition procedures were sufficiently accurate and efficient in terms of cost and time to convert 100% of the character and field data of the rasterized image into computer readable form with 100% confidence, then conversion of the rasterized image into computer readable form would be straightforward. However, existing systems cannot do so on documents prepared with a wide variety of type fonts captured at a diversity of user-controlled imaging machines on a complex form with the variety of possible textural and numeric data. Subsequent processing requires the particular novel combination of methods embodied by the present invention to create, select, present, and update four levels of context information required to permit automatic operation of the recognition 120 (FIG. 8) and message-creation 140 processes.

Figure 10:
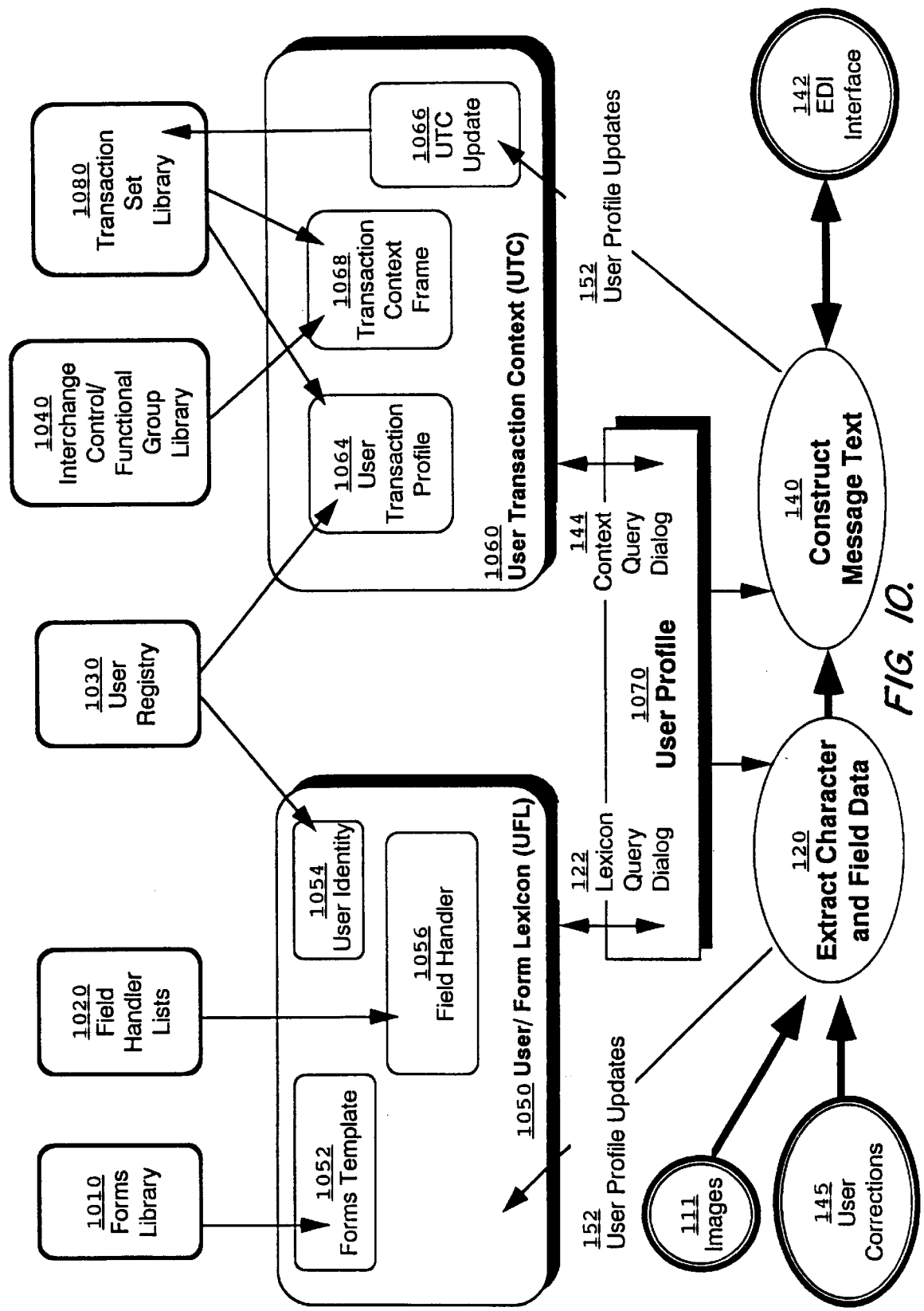
FIG. 10 is an illustration of the user profile processing employed by the invention.

The present invention uses character recognition to produce a record of candidate text 971 (as shown in FIG. 9) for selected ones of the characters in the bitmap field 95. Confidence levels 973 are computed as a result of the recognition process. The text is parsed into segments 975 using blank space separation and context matching (which context is provided in the user profile 1070) (FIG. 10). A context log 977 (FIG. 9) records the particular context data (in the user profile 1070) (FIG. 10) used to generate the candidate text 971.

User profiles, which are specialized data structures, enable creation of a valid computer text strings or EDI messages from the bitmap image. The computer system 50 (FIG. 3) constructs these user profiles from pre-existing data at the time of recognition and message construction. The software process maintain user profiles 130 of FIG. 8 maintains databases used to construct the user profiles. For each new document processed, the system updates a user profile. Feedback user profile updates 152 supplements and updates data used to construct the user profiles. The registered user indirectly provides the feedback to update the user profile.

FIG. 10 illustrates the working of process maintain user profiles 130 identified in FIG. 8. A single instance of a user profile 1070 includes context data all relating to the documents generated by a single registered user. The user profile 1070 is used by the process extract character and field data 120 (FIG. 8) to interpret bitmap images and process construct message text 140 to assemble valid coded text segments into structured coded text files or EDI messages. User profiles are initialized by the system operator using information provided by the registered user. User profiles are then updated from time to time by the system, based on documents submitted and the transactions approved by the registered user.

User profiles include data structures referred to as user/ form lexicons 1050 (UFLs) and user transaction contexts 1060 (UTCs). UFLs provide target values for fields within forms submitted by individual registered users. UTCs provide target values for the coded text required to construct valid EDI messages and input computer transactions.

Users must register with the system operator in order to use the system. The system operator controls the layout of the printed forms with which registered users create input documents. Registered users are encouraged to use only original forms, not copies. Registered users then create application or trade declaration documents for submission to the system by typewriting, handwriting, or stamping information upon the printed forms.

The system operator maintains a stock of the preprinted forms, and distributes them to registered users periodically or upon request. The approximate number of each type of form sent to each registered user is logged. Forms distribution includes mail, hand or facsimile transmission upon user request. The physical appearance of all such forms is stored in forms library 1010, along with the distribution status of forms by type to registered users. Thus, for each user, a known list of target form types can be selected by the system.

For each form type stored in the forms library 1010, the system operator creates a form template 1052. A form template is a data structure describing unique landmark locations and features for each type of form. The templates also relate regions on respective form types to named fields. Form templates are updated only by the system operator.

For each registered user, the system operator creates a user identity, which is a data structure relating this data to unique user names. User identity data is stored in a database user registry 1030. Users can request updates to this data by communicating to the system operator (via the provide user services process 150) (FIG. 8).

At the time of initial user registration, certain data is entered and stored in the user registry database 1030 which relates individual users to identity data. This identity data includes, for example, names and addresses the registered user will record on submitted documents, phone numbers of the imaging machines that the user uses to transmit documents to the system, phone, postal, pager, or other addresses for user contact or notification, bank account, tax identification and other registration numbers the user regularly uses. Additionally, the user identity data includes types of forms anticipated for regular use. If available, the identity information includes identity of regular trading partners, and such recurring data as the names and codes for commodities usually bought or sold.

For each type of form, the system operator creates a field handler list. The field handler list is stored in a database 1020. Field handlers 1056 are individual data structures relating to one or more particular forms, and which contain the expected or valid contents of named fields known in the system. Named fields provide targets for the recognition process.

Field handlers are initialized by the system operator. These field handlers may be updated by the system operator or by feedback provided from the user through the provide user services process 150. If a recognition result is approved or corrected by the user, then the result is added to the field handler for that UFL.

The user identity data, the form templates, and the field handler lists taken together, are a named data structure user/form lexicon (UFL) 1050 stored on the data processing unit 58 (FIG. 3). The extract character and field data process 120 (FIG. 8) (the recognition process) selects, for each document image, the UFL which will most likely provide the target data intended to be written by a single registered user on a single form. Using this data, the recognition process creates an expectation (or target) of the user's identity, the forms being used, and the data written in each area of the document.

In the case of user identities, targets are expressed as plain-text character values. In the case of forms, targets are expressed as landmarks, ruled lines, field regions, and pointers to field handlers. In the case of fields, targets are expressed as plain-text character values, edit patterns, or numeric results.

The maintain user profiles process 130 and the recognition process 120 conduct an iterative lexicon query dialog 122 that results in a selection of the single best UFL to be applied to the document image currently being recognized. Thus, for each fax image, the maintain user profile process 130 will receive a sequential set of requests from the recognition process 120. It will satisfy these requests by supplying UFLs containing unique user identities, form templates, and field handlers to the recognition process.

For example, the first requests for a new image will be to retrieve one or more form templates. These requests contain an argument containing the recognition result obtained by performing recognition on the landmark region. The recognized landmark is used to select a candidate form template, which is sent as the response to the query by the recognition process. Unsuccessful recognition of the form will cause a repeat request for nearest neighbor form types. Each form type template contains pointers to a list of other form types similar in appearance. Up to five subsequent queries/responses are attempted to secure a suitable form template. Unsuccessful recognition of form type after attempted matching against nearest neighbors will cause a request for user identities 1054 (FIG. 10). These requests contain an argument containing the courtesy facsimile machine identifier or telephone network caller ID or null. Responses to these requests are the forms most likely to be employed by the registered user indicated by the identifier or caller ID.

In the case of null inbound-caller data, the fax image is sent to a keying terminal and displayed on a screen to a human operator. The operator selects the form type from a list and keys any information found in the image that identifies the registered user. The fax image is then returned to the recognition process.

Successful recognition of form type will cause subsequent requests for user identity and field handlers. The maintain user profiles process 130 (FIG. 8) locates and supplies the corresponding UFLs to the recognition process.

A UTC includes interchange control/functional group library entries for a particular registered user, data structures recording the transaction groups employed by that user, message-level information on recent transaction groups used, data-element target text assembled over a period of time determined by the system operator, and the transmission status and content of messages sent/received for the current transaction set(s) open.

Within the UTC for each user are data structures containing the authorized target text for each segment of all recent EDI messages released. The size of these data structures— and thus their historical depth—are governed by the processing and storage capacity of the particular system embodiment and the diversity of the registered-user population.

Transaction set libraries 1080 (FIG. 10) are also maintained to ensure coverage of UTCs in cases where multiple documents are required to build a single message, or where a single document generates messages that span transaction sets. These libraries include data structures representing the common data-element relationships across document fields, messages, and/or transaction sets. The structure of these libraries is initiated by the system operator; table row entries are made through individual UTC updates 1066 which reflect individual instances of data reviewed and authorized for release by registered users. The UTC update process 1066 also reflects the result of inbound EDI messages.

The UTC data structure is ordered to present ten or fewer candidates of target text for each data element within each data segment within each message for all transaction sets authorized for release by the registered user. The candidates are constructed from combinations of the transaction context frame 1068 and user transaction profile 1064. Both these data structures, for a given UTC, are updated with current transaction-set experience drawn from the transaction set library 1080.

The preferred embodiment of the present invention provides a mechanism to ensure that the data extracted from the image reflects accurately the user's original intent and meaning. Users 101 (FIG. 8) thereby are requested to authorize the release of data from the computer system to independent computer systems via the EDI interface 142.

One method of soliciting this authorization from registered users is to send them a copy of the candidate text via facsimile. Methods of formatting data into facsimile images are well-known and commercially available. These facsimile documents sent to the user are called turnaround forms.

The candidate text is presented to the user on the turnaround form in easily-readable fonts and page layouts. Check boxes are provided at known locations on the turnaround form adjacent to the candidate text of data elements. Registered users indicate their approval or non-approval by marking or rubber stamping these check boxes on the page and transmitting the page back to the system via imaging machine.

Upon receiving these turnaround forms, the recognition processes identify them from newly submitted forms by the form number. Recognition is then performed only on the mark-sense regions, and correction codes generated for the corresponding data elements. Each turnaround form is also displayed to a human operator for scrutiny of other handwritten information on the form if present as detected by the system.

Another method of soliciting authorization from registered users is to load candidate text into a database accessible through interactive voice response, such as Infobot commercially available from Syntellect Inc., Phoenix, Ariz. Registered users telephone a service center and, after entering personal identification codes, use their DTMF keypad to inquire of the status of pending EDI messages and other outbound transactions. Authorization for release of outbound messages is similarly made through DTMF keypad sequences. (This voice-response channel is also employed to deliver messages received from independent computer systems and to provide management information to users.)

Another method of soliciting and receiving authorization from registered users is to staff and equip a service center to handle voice telephone traffic with data displayed on terminals. Automatic call director systems route inbound calls and outbound notifications to operators equipped with data terminals upon which are displayed candidate and final text (and other system-supported information services). Users converse with the operators to give instructions and receive messages and information Still another method of soliciting and receiving authorization from registered users is to deploy ATM-style computer terminals in convenient, secure locations. This terminal network communications directly with the invention's telecommunications unit 54 (FIG. 5). Users are required to provide personal identification codes to view and/or authorize messages.

Conclusion

In conclusion, the present invention provides simple cost effective EDI access to users without computers. By permitting the user to send an image of a completed commercial document to the described system, the user may effectively conduct business over the electronic network as if he used a computer to so communicate with the independent computer systems of trading partners. The integrated computer system provides capability for many services in addition to the simple sending and receiving of transactional data. For example, it also acts as an agent of the user, accumulating and processing the results of a plurality of each user's transactions with multiple trading partners to create management information of particular commercial value to each user. Thus, by use of the present invention individual users may harness computerized applications and obtain management information previously unobtainable with business records maintained on paper documents. The above description does not limit the scope of the invention which the appended claims define.

What is claimed is:

1. A method for processing a commercial transaction form to convert it from an electronic image of a form into a valid coded text string that can initiate automated data processing procedures, comprising the steps of:

receiving an encoded rasterized image of the form from a particular user, said rasterized image including a plurality of character and field data for conversion into the valid coded text string;

decoding said encoded image to produce an electronic representation of the form in a computer memory;

enhancing said electronic representation, said enhancing step comprising the steps of:

removing noise from said electronic representation by identifying and suppressing random noise bits;

deskewing said electronic representation; and compensating for any velocity distortion in image formation that exceeds a predetermined threshold;

accessing a user profile associated with said particular user, said user profile including user/forms lexicons, user transaction contents and forms inventories, to extract and validate a first set of said plurality of character and field data from said electronic representation;

constructing a coded text string, said text string constructing step including the steps of:

keying manually a second set of said plurality of character and field data not extracted and validated as part of said first set of said plurality of character and field data; and accessing said user profile, responsive to said first and second sets of said plurality of character and field data, to assemble the coded text from said image of form to produce an assembled text; and validating, using said user profile, said assembled text to produce the valid coded text string.

2. The processing method of claim 1 further comprising the step of displaying said validated coded text string to said particular user for approval.

3. The processing method of claim 1 further comprising the step of:

transmitting said validated coded message to an independent computer system for initiation processing of a particular transaction identified in the form image.

4. The processing step of claim 3 further comprising the steps of:

receiving an inbound message from said independent computer system indicating the status or results of said processing; and notifying said particular user of said status or results.

5. A method for processing a form to convert it from an electronic image of a form into a valid coded text string that automatically initiates data processing procedures, comprising the steps of:

capturing an image of the form received from a particular user;

extracting a plurality of character and field data candidate strings from said image; and validating said character and field data candidate strings using a user profile associated with said particular user to produce the valid coded text string in a computer-readable format.

6. The processing method of claim 5 wherein said text validating step includes the step of producing a valid EDI message from the valid coded text string.

7. The processing method of claim 6 further comprising the step of:

transmitting said valid EDI message to an independent computer system for initiation of automated data processing of a particular transaction identified in the form image.

8. The processing method of claim 5 further comprising the step of transmitting the valid coded text string to said particular user for approval.

9. The form processing method of claim 8 further including the step of transmitting a facsimile message to said particular user including said validated coded text string.

10. The processing method of claim 5 further comprising the step of:

transmitting said validated coded text to an independent computer system for initiation of automated data processing of one or more particular transactions identified in the form image.

11. The processing method of claim 10 further comprising the steps of:

receiving an inbound EDI message from said independent computer system responsive to said automated data processing;

formatting said inbound EDI message to produce a message understandable by said particular user; and transmitting said understandable message to said particular user.

12. The processing method of claim 11 further comprising the step of presenting information services to a user responsive to a plurality of said inbound EDI messages.

13. The processing method of claim 10 further comprising the steps of:

receiving an inbound coded text file from said independent computer system responsive to said automated data processing;

formatting said inbound coded text file to produce a message understandable by said particular user; and transmitting said understandable message to said particular user.

14. The processing method of claim 13 further comprising the step of presenting information services to a user responsive to a plurality of said validated coded text files.

15. The form processing method of claim 5 wherein said form is a standardized document having blank areas and said particular user enters data onto said standardized document.

16. The form processing method of claim 5 wherein said step of capturing an image includes transmitting said form via a facsimile machine.

17. A system for producing valid coded text from data extracted from an image of a hardcopy of a commercial transaction form, the image including a plurality of characters represented by an electronic raster having a matrix of binary picture elements making up the plurality of characters wherein the plurality of characters includes information identifying a particular user and at least one type of transaction from a plurality of users and a plurality of transactions, comprising:

(a) image enhancement means for:
(i) deskewing the image when angular distortion of the image exceeds a predefined value; and
(ii) removing an axial distortion from the image introduced during conversion of the hardcopy to the electronic raster to produce an enhanced document image;

(b) character extraction means, coupled to said image enhancement means, for operating on said enhanced document image to identify and produce a first set of machine readable representations of the plurality of characters, said character extraction means including a database having the plurality of user identity and transaction data information stored and responsive to said first set of said plurality of characters to produce a second set of machine readable representations of the plurality of characters, said character extraction means further including means for keying manually a third set of the plurality of characters not in said first set and second set;

(c) assembly means, coupled to said character extraction means, for receiving said first, second and third sets of the plurality of characters to construct and validate coded text making a transaction;

(d) communication means, coupled to said assembly means, for transmitting to a host computer said valid coded text for subsequent automated data processing; and (e) means, coupled to communication means, for delivering an output of said automated data processing to the particular user.

18. An apparatus for processing a form to convert it from an electronic image of a form into a valid coded text string that initiates automated data processing procedures, comprising:

means for receiving an encoded rasterized image of the form sent by a particular user, said rasterized image including a plurality of character and field data for conversion into the validated coded text;

means, coupled to said means for receiving, for decoding said encoded image to produce an electronic representation of the form in a memory of a computer;

means, coupled to said means for decoding, for enhancing said electronic representation, said means for enhancing comprising:

means for removing noise from said electronic representation by identifying and suppressing random noise bits;

means, coupled to said means for removing noise, for deskewing said electronic representation; and means, coupled to said means for deskewing, for compensating for any velocity distortion in image formation that exceeds a predetermined threshold;

means, coupled to said means for enhancing, for accessing a user profile associated with said particular user, said user profile including user/forms lexicons, user transaction contents and forms inventories, to extract and validate a first set of said plurality of character and field data from said electronic representation;

means, coupled to said means for enhancing, for constructing a coded text string, said means for constructing comprising:

means for keying manually a second set of said plurality of character and field data not extracted and validated as part of said first set of said plurality of character and field data; and means, coupled to said means for keying, for accessing said user profile, responsive to said first and second sets of said plurality of character and field data, to assemble said coded text string; and means, coupled to said means for accessing, for validating said coded text string to produce the valid coded text string.

19. The form processing apparatus of claim 18 wherein said means for validating said coded text includes means for producing validated coded text.

20. The form processing apparatus of claim 19 further comprising:

means, coupled to said means for producing validated coded text, for transmitting said validated coded text to a computer for processing into output text.

21. The form processing apparatus of claim 20 further comprising:

means, coupled to said transmitting means, for receiving said output text from said computer; and means, coupled to said means for receiving, for delivering said output text to said particular user.

22. The form processing apparatus of claim 21 further comprising:

means, coupled to said means for receiving, for processing said output text from said computer; and means, coupled to means for receiving, for delivering a result of said processing to a user.

23. The form processing apparatus of claim 18 further comprising means, coupled to said means for validating said coded text, for displaying the valid coded text string to said particular user for approval.

24. An apparatus for processing a form to convert it from an electronic image of a form into a valid coded text string that can initiate a user service identified by the form, comprising:

means for capturing an image of the form received from a particular user;

means, coupled to said means for capturing, for extracting a plurality of character and field data candidate strings from said image;

means, coupled to said means for extracting, for validating, using a user profile associated with said particular user, said character and field data candidate text to produce the validated coded text in computer-readable form as output text;

means, coupled to said means for validating, for receiving and processing output text to produce a validated message; and means, coupled to said means for receiving and processing output text, for providing user services responsive to said validated message.

25. The form processing apparatus of claim 24 wherein said means for validating includes means for producing a validated coded EDI message.

26. The form processing apparatus of claim 24 further comprising means, coupled to said means for validating, for transmitting said validated coded text string to said particular user for approval.

27. The form processing apparatus of claim 24 further comprising:

means, coupled to said means for validating, for transmitting said validated coded text to a computer for initiation of the processing identified in the form image.

28. The form processing apparatus of claim 27 further comprising:

means, coupled to said means for transmitting, for receiving processing results from said computer; and means, coupled to said means for receiving, for transmitting to said particular user such results.

29. An apparatus for processing a form to convert it from an electronic image of a form into a valid coded text string that initiates automated data processing, comprising:

a telecommunications server including an image receiver and a computer gateway, for receiving an electronic image of a form from a user and for transmitting coded text strings;

an image and data server, coupled to said telecommunications server, for storing said electronic image and coded text;

an image processing server, coupled to said image and data server, for extracting character and field data candidate text from said image through use of a dynamic database containing transaction context information and user profile information associated with said user, wherein said dynamic database is updated responsive to transactions initiated by forms submitted from said user; and a data processing server, coupled to said image processing server and to said telecommunications server, for:

confirming a correspondence between said character and field data candidate text and information contained within said image to produce a coded text string in computer readable form;

constructing a valid data file from said coded text string; and passing said valid data file to said telecommunications server for transmission to an independent computer system to initiate processing identified within said image.

30. A method for initiating a commercial transaction, comprising the steps of:

entering a plurality of data into a form that identifies a particular commercial transaction; thereafter converting said form into a binary image; thereafter extracting a plurality of candidate strings from said binary image, said plurality of candidate strings including a first identification string identifying a particular user; thereafter accessing a user profile associated with said identification string, wherein said user profile is dynamically assembled from a prior use by said particular user; thereafter validating said plurality of candidate strings using said user profile to produce a valid computer-readable message identifying said particular user and said particular commercial transaction; and thereafter initiating said particular commercial transaction using said valid computer-readable message.

31. The commercial transaction initiating method of claim 30 further comprising the step of updating said user profile responsive to said valid computer-readable message.

* * * * *